Sept. 24, 1957     W. M. ZOLLER ET AL     2,807,572
APPARATUS AND METHOD FOR REMOVAL OF POPCORN POLYMER
FROM COLUMNS BY CONTINUOUS FILTRATION
Filed May 26, 1955
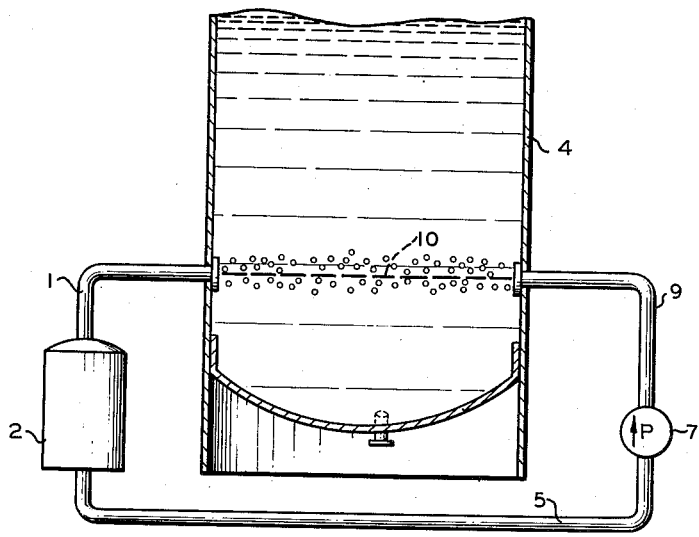
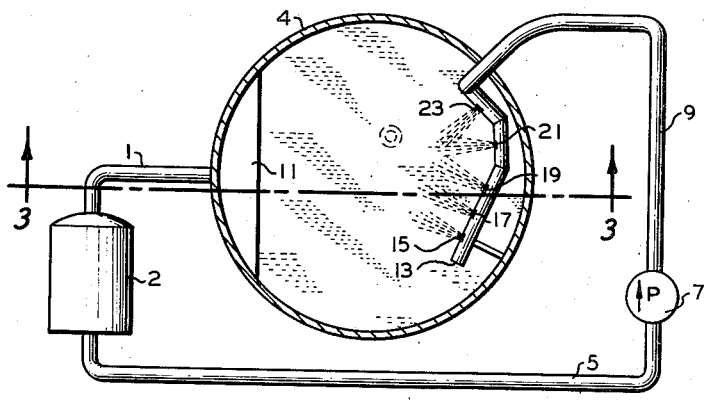
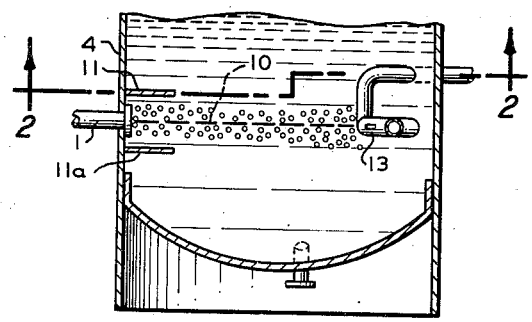
INVENTORS
W. M. ZOLLER
L. C. MC GILL
BY
*Hudson & Young*
ATTORNEYS

United States Patent Office 2,807,572
Patented Sept. 24, 1957

2,807,572

APPARATUS AND METHOD FOR REMOVAL OF POPCORN POLYMER FROM COLUMNS BY CONTINUOUS FILTRATION

Willis M. Zoller and Lemaster C. McGill, Borger, Tex., assignors to Phillips Petroleum Company, a corporation of Delaware Application May 26, 1955, Serial No. 511,226

14 Claims. (Cl. 202—39)

This invention relates to the processing of monomeric materials. In a more specific aspect, this invention relates to the inhibition of undesirable polymer growth and removal of polymers from such monomeric materials during processing. In a still more specific aspect this invention relates to a method and apparatus for removing or skimming popcorn polymer from monomeric materials which form popcorn polymer and which are being fractionally distilled.

This application is a continuation-in-part of our copending application Serial No. 414,708, filed March 8, 1954, now abandoned, which was a continuation-in-part of our copending application Serial No. 254,958, filed November 5, 1951, now abandoned.

It is well known that monomeric materials, such as 1,3-butadiene, styrene, vinyl pyridines, and the like, will polymerize to form a hard porous opaque material, insoluble in ordinary solvents such as benzene or carbon tetrachloride. This material has the ability to seed itself or grow when in contact with liquid or gaseous monomeric material, and has been referred to in the art as cauliflower or sponge polymer. More recently, this type of polymer has been referred to as popcorn polymer. The term "popcorn polymer" will be used throughout the specification and claims to mean a self-propagating polymer which has the above-mentioned characteristics. Popcorn polymer is formed by the polymerization of monomeric material in which an olefinic linkage is conjugated with another olefinic linkage as in the conjugated diolefins, such as 1,3-butadiene, or by the polymerization of compounds in which the olefinic linkage is conjugated with some other type of unsaturated linkage, for example such as the unsaturated linkage in an aromatic ring, as in styrene or pyridine, or a carbon to oxygen double bond such as in methyl methacrylate. Copolymerization of the above-mentioned materials will also produce the popcorn type polymer. The most remarkable property of popcorn polymer is its ability to seed itself or grow when in contact with liquid or gaseous monomeric material.

The manufacture, separation, and purification of butadiene and styrene now form the basis of the synthetic rubber industry. In plants, such as described in U. S. Patent 2,386,310, dated October 9, 1945, which issued to K. H. Hachmuth, wherein butadiene is being recovered, separated, or purified by processes which involve fractional distillation, the growth of popcorn polymer has caused a great deal of trouble. The rapid growth of popcorn polymer not only causes a loss of much valuable material but also plugs fractionators, lines, pumps, condensers and other auxiliary equipment which results in costly shutdowns of the entire plant. Furthermore, the increase in volume which occurs when liquid or gaseous monomeric material is converted into popcorn polymer produces excessive pressures which are sufficient to cause the rupture of steel lines and deformation of fractionators and the like. In one instance, a nine foot diameter fractionating column used for purifying butadiene was removed from service and cleaned. Some small seeds of popcorn polymer were accidentally left on one tray of the column. Within a few months the growth of these few minute seeds was sufficient to entirely plug the 2' x 9' diameter space between the trays of the column, and deformed the beams which supported the uppermost of the two trays. Such a mass of polymer can only be removed by manual means which in effect resemble mining operations. Furthermore, the growth of popcorn polymer has been known to rupture steel lines while they were filled with highly inflammable fluids such as butadiene. The hazards resulting from the growth of popcorn polymer are thus readily apparent.

Popcorn polymer is also formed when vinyl pyridines are distilled. This is described and the hazards attendant upon the formation of such polymer are discussed in Industrial and Engineering Chemistry, May 1948, "Substituted Vinylpyridines As Monomers for Synthetic Elastomers" by Robert L. Frank et al.

The growth phenomenon of popcorn polymer has been studied by many investigators. One hypothesis which has been proposed is that popcorn polymer contains a large number of groups which give rise to free radicals. Such a group might be a hydroperoxide, which is formed when oxygen attacks methylene groups adjacent to an olefinic linkage. The greater the number of methylene groups in a polymer, the higher its activity as a popcorn polymer seed. Regardless of the exact reaction mechanism of popcorn polymer growth, the most compelling problem is to provide a means for inhibiting or preventing this growth. On the basis of the above hypothesis of popcorn growth it was assumed by others that an ideal deactivator would be a volatile agent which would destroy the peroxide present in the seed and prevent the formation of additional peroxides. This could be accomplished by a substance which would destroy the double bonds promoting the oxidation resulting in the peroxidic group. The deactivating material might also combine with the seed and thus inhibit reactions of the free radical type. It is known that nitrogen dioxide in dilute mixture with air is absorbed by the popcorn polymer seed which is thus rendered inactive. For effective deactivation with nitrogen dioxide the popcorn polymer seed should be dry and the temperature during the deactivation treatment should be maintained at about 175 to 200° F. Also, it is known that a vapor phase treatment employing about 5 to 10 percent nitrogen dioxide in admixture with nitrogen is effective in deactivating popcorn seeds. In a patent to Robert G. Boatright and John Fetchin, U. S. 2,616,935, issued November 4, 1952, the use of nitric acid is disclosed as a popcorn polymer deactivating material.

An object of this invention is to provide a method and apparatus for removing popcorn polymer from monomeric materials which form popcorn polymer.

Another object is to provide a method for the inhibition of the formation of popcorn polymer material during the fractionation of polymerizable monomeric materials.

A further object is to provide a method for removing popcorn polymer from monomeric conjugated diolefins which produce popcorn polymers upon distillation.

A still further object is to provide a method for removing popcorn polymer from monomeric vinyl pyridines which produce popcorn polymer in a fractional distillation zone.

Other objects and advantages of this invention will be apparent to one skilled in the art from the accompanying discussion and disclosure.

We have discovered that when popcorn polymer is formed from monomeric materials in the presence of a liquid which is immiscible with and heavier than the monomeric material, the popcorn polymer accumulates at the interface between the phases formed by the two liquids. At the interface the popcorn polymer is partly in the monomeric material phase and partly in the heavier immiscible liquid phase. In accordance with our invention, liquid containing the popcorn polymer is withdrawn from the interface between the monomeric material and the immiscible, heavier liquid, thereby removing popcorn polymer from the processing zone in which the popcorn polymer is formed. Broadly, our invention resides in the step of withdrawing liquid containing popcorn polymer through a draw-off point at said interface. The withdrawn liquid containing popcorn polymer can then be passed to any desired processing zone, or discarded. Usually it is preferred to add at least two further steps to the step described above which is the broad inventive feature, these two steps being removing popcorn polymer from the withdrawn liquid and returning withdrawn liquid to the processing zone.

The method of popcorn polymer control with which this invention is concerned is seed inhibition, that is, the constant maintenance of a certain concentration of an inhibitor in part of the plant during operation. This procedure is most suitable in those places where popcorn polymer grows in contact with a liquid phase, for example in the distillation zone and allied equipment. A specific example of a monomeric system wherein the present invention has found application is in the distillation of butadiene in the presence of an aqueous solution of sodium nitrite. The aqueous solution of sodium nitrite, which is immiscible with and heavier than butadiene, is injected into the upper portion of a butadiene fractionating zone. The nitrite solution may be added, if desired, to the reflux accumulator and passed with the reflux stream to the fractionation zone where it flows downwardly through and in contact with the inner surface of the fractionation zone. The nitrite solution is removed from the base of the fractionation zone and is recycled. The concentration of the nitrite in the aqueous solution may vary from about 1 to about 20 or more percent by weight of the solution, but usually about a 4 to 10 percent solution is preferable. Some popcorn polymer is formed in the presence of the aqueous solution of sodium nitrite and this popcorn polymer accumulates at the interface between the hydrocarbon and aqueous phases. Liquid is withdrawn from the distillation column through a draw-off point at said interface, said liquid containing the popcorn polymer. The popcorn polymer is removed from the withdrawn liquid and the latter is returned to the bottom of the fractionator. The process of the present invention is applicable to the use of any popcorn polymer inhibitor which is used in solution in a liquid which is immiscible with and heavier than the monomeric material being distilled.

With respect to the specific example described above, other aqueous solutions of nitrite salts are effective in the process of our invention, such as alkali metal nitrites. These and other specific examples of nitrities which can be used are potassium nitrite, lithium nitrite, ammonium nitrite, barium nitrite, calcium nitrite, cesium nitrite, cupric nitrite, silver nitrite and strontium nitrite. Aqueous solutions of nitrous oxide, nitric oxide, nitrogen trioxide and ammonia also can be used.

A further example of the method of our invention is in the distillation of vinyl pyridines. In a process where 2-methyl-5-ethyl pyridine (MEP) is separated from 2-methyl-5-vinyl pyridine (MVP) by fractional distillation, inhibition of popcorn polymer formation from the MVP is a vital concern. An aqueous solution of sodium polysulfide has been used as a polymerization inhibitor in the distillation of the MEP-MVP system wherein the MEP is taken overhead. The water-MVP-MEP system forms an azeotrope and the overhead from this distillation, which contains a small percentage of MVP, is passed to an overhead accumulator vessel where a water phase and a hydrocarbon phase appear. Popcorn polymer formed from the MVP in the overhead accumulates at the interface in the accumulator, and, in accordance with the invention, is withdrawn with the interfacial liquid. The popcorn polymer is removed from the interfacial liquid which is then returned to the accumulator.

In accordance with a further aspect of this invention means are provided for skimming popcorn polymer from an interface between a monomeric material and an immiscible liquid.

Figure 1 is a sectional view, partially in elevation, of the popcorn polymer skimmer apparatus which is now in use in a fractional distillation column for the production of butadiene.

Figure 2 is a further embodiment of the popcorn polymer skimmer apparatus shown in horizontal cross section taken through 2—2 of Figure 3.

Figure 3 is a cross section taken through line 3—3 of Figure 2 vertically through the column showing the side view of the polymer skimming apparatus within and at the interface of the hydrocarbon and aqueous phases near the bottom of the fractionation column.

In the operation of a fractional distillation column for producing butadiene and utilizing the method and apparatus of the present invention, the aqueous layer of inhibitor is continuously or intermittently pumped from the bottom of the column to an accumulator and the inhibitor is then returned and injected into the upper portion of the column as described hereinbefore. The rate of withdrawal of the aqueous phase can be adjusted by any known means to maintain the interface between the aqueous phase and the hydrocarbon phase at the level from which the liquid containing the popcorn polymer is withdrawn. One method for maintaining the aqueous phase hydrocarbon interface at the desired level is to install a float mechanism in the aqueous phase at the interface. The vertical position of the aqueous phase-hydrocarbon interface is then known and can be conveniently adjusted to the polymer take-off position.

Referring now to the embodiment of our invention shown in Figure 1, the apparatus comprises a circulating system whereby liquid containing polymer at the hydrocarbon-aqueous phase interface 10 is drawn off from fractional distillation column 4 through line 1 and delivered to a skimmer or strainer 2. A desirable skimmer is a vessel approximately two feet in diameter and eight feet long having an internal basket or screen of four to twelve mesh. The polymer is retained on the screen and the mixture of hydrocarbons and aqueous phase inhibitor is returned to the column 4 via line 5, pump 7 and line 9. As was indicated before, this operation can be continuous or intermittent when the accumulation of polymer in the column warrants the use of the operation. It is advantageous to locate the entrance of line 9 into column 4 at a position directly opposite the position of draw-off line 1 in column 4 so that the flow of the returning liquid moves the polymer and the interfacial liquid toward line 1. However, line 9 can be positioned in column 4 at any convenient location in the lower portion of the column. When it is desired to remove the basket or screen from within the polymer skimmer, line 1 is closed, the pump 7 is operated until it goes on suction, and then line 9 is shut off. A compressor is then connected between the two shut off points at or near the skimmer to evacuate this part of the system of hydrocarbons by compressor suction. After the evacuation, the skimmer is disassembled and the polymer removed.

Referring now to Figures 2 and 3, a further embodiment of our invention is shown whereby liquid containing popcorn polymer at the hydrocarbon-aqueous phase interface is drawn off between two horizontal plates or baffles 11 and 11a, Figure 3, inside column 4. Plates 11 and 11a prevent by-passing of either the hydrocarbon or aqueous phase. These plates or baffles are ordinarily about six inches apart which is approximately the width of the liquid about the interface which contains the polymer. The liquid containing the polymer is delivered through line 1 to skimmer 2 where the polymer is removed as described in connection with Figure 1. The polymer-free liquid is returned to the column via line 5, pump 7 and line 9. In this embodiment, however, there is also provided a header 13 within the column and which is connected to the outlet end of line 9. Header 13 is a pipe conforming somewhat to the curvature of the lower section of column 4 having outlets 15, 17, 19, 21 and 23 which expel the returned liquid in a direction toward the location of draw-off pipe 1, thus serving to move the polymer and liquid containing the polymer toward line 1.

Combination and modifications of the apparatus elements shown in Figures 1, 2 and 3 can be used also. For example, baffle plates 11 and 11a can be installed in the apparatus of Figure 1.

Prior to the use of the installation provided in accordance with this invention in a butadiene fractionator, sufficient polymer accumulated in the base in the bottom of the fractionator so that it was carried over into the external kettle of the column. The polymers in the kettle deposit on the tubes of the heat exchanger which reduce the heat transfer co-efficient to the extent that it is necessary to exchange the tube bundle. Not only is it expensive and time consuming to change and clean the tube bundle, but the fractionation column becomes erratic in operation. However, since the use of the present invention, operating time between clean-outs has increased from five and one-half months to at least one year. In addition we have now operated for almost a year since the last clean out. Due to a recent emergency shut down the fractionation column was inspected and any polymers found were removed. It is unknown how long the column would have operated without requiring removal of polymers, since the polymer accumulation had not even closely approached the minimum for interfering with column operation. By the process of the present invention substantial savings in costs are achieved. For example, in one instance a savings of over $5500 a year resulted, in addition to intangible benefits such as more smooth uniform operation.

We claim:

1. In a process for the recovery of a liquid monomeric material free of popcorn polymer formed in a recovery zone in the presence of a liquid which is immiscible with and heavier than said monomeric material, said immiscible liquid being present in an amount sufficient to form a separate immiscible liquid phase whereby an interface is formed between the monomeric material phase and the immiscible liquid phase, the improvement which comprises withdrawing a liquid stream carrying said popcorn polymer through a draw-off point at said interface in an amount sufficient to prevent an accumulation of the polymer within the recovery zone.

2. In a process for the recovery of a liquid monomeric material free of popcorn polymer formed in a recovery zone in the presence of a liquid which is immiscible with and heavier than said monomeric material, said immiscible liquid being present in an amount sufficient to form a separate immiscible liquid phase whereby an interface is formed between the monomeric material phase and the immiscible liquid phase, the improvement which comprises withdrawing a liquid stream carrying said popcorn polymer through a draw-off point at said interface in an amount sufficient to prevent an accumulation of the polymer within the recovery zone, removing the popcorn polymer from said withdrawn liquid and returning the withdrawn liquid to said processing zone.

3. In a process for fractionally distilling a monomeric material which forms popcorn polymer in a fractional distillation zone, said fractional distillation being effected in the presence of a liquid which is immiscible with and heavier than said monomeric material, said immiscible liquid being present in an amount sufficient to form a separate immiscible liquid phase whereby an interface is formed between the monomeric material phase and the immiscible liquid phase, the improvement which comprises withdrawing liquid containing popcorn polymer through a draw-off point at said interface in an amount sufficient to prevent an accumulation of the polymer within the fractional distillation zone, removing the popcorn polymer from said withdrawn liquid and returning the withdrawn liquid to said fractional distillation zone.

4. In a process for fractionally distilling a monomeric conjugated diolefin hydrocarbon in the presence of an aqueous solution in a fractional distillation zone under conditions whereby popcorn polymer is formed from said diolefin, said aqueous solution being present in sufficient amount to form an aqueous phase whereby an interface is formed between the hydrocarbon phase and the aqueous phase, the improvement which comprises withdrawing liquid containing popcorn polymer through a draw-off point at said interface in an amount sufficient to prevent an accumulation of the polymer within the fractional distillation zone, removing the popcorn polymer from said withdrawn liquid and returning the withdrawn liquid to said fractional distillation zone.

5. In a process for fractionally distilling a monomeric conjugated diolefin hydrocarbon in the presence of an inhibitor in aqueous solution in a fractional distillation zone, said inhibitor serving to reduce the formation of popcorn polymer from said diolefin hydrocarbon and being present in sufficient amount to form an aqueous phase whereby an interface is formed between the hydrocarbon phase and the aqueous phase, the improvement which comprises withdrawing liquid containing said popcorn polymer through a draw-off point at said interface in an amount sufficient to prevent an accumulation of the polymer within the fractional distillation zone, removing the popcorn polymer from said withdrawn liquid and returning the withdrawn liquid to said fractional distillation zone.

6. A process according to claim 5 wherein said inhibitor is a nitrite salt.

7. A process according to claim 5 wherein said inhibitor is a nitrite salt of an alkali metal.

8. A process according to claim 5 wherein said monomeric conjugated diolefin is a butadiene and wherein said inhibitor is sodium nitrite.

9. A process according to claim 8 wherein said inhibitor is potassium nitrite.

10. In a process for fractionally distilling a monomeric conjugated diolefin hydrocarbon in the presence of an inhibitor in aqueous solution in a fractional distillation zone, said inhibitor serving to reduce the formation of popcorn polymer from said diolefin hydrocarbon and being present in sufficient amount to form an aqueous phase whereby an interface is formed between the hydrocarbon phase and the aqueous phase, the improvement which comprises withdrawing liquid containing said popcorn polymer through a draw-off point at said interface in an amount sufficient to prevent an accumulation of the polymer within the fractional distillation zone, passing said withdrawn liquid and popcorn polymer to a skimmer, separating popcorn polymer from said liquid in said skimmer, and returning the remaining withdrawn liquid to said fractional distillation zone at said interface and opposite to said draw-off point.

11. In a process for fractionally distilling a monomeric conjugated diolefin hydrocarbon in the presence of an inhibitor in aqueous solution in a fractional distillation zone, said inhibitor serving to reduce the formation of popcorn polymer from said diolefin hydrocarbon and being present in sufficient amount to form an aqueous phase whereby an interface is formed between the hydrocarbon phase and the aqueous phase, the improvement which comprises withdrawing liquid containing said popcorn polymer through a draw-off point at said interface in an amount sufficient to prevent an accumulation of the polymer within the fractional distillation zone, passing said withdrawn liquid and popcorn polymer to a skimmer, separating popcorn polymer from said liquid in said skimmer and returning the remaining withdrawn liquid to said fractional distillation zone at said interface through a header opposite said draw-off point so that the flow of returned liquid moves the popcorn polymer toward said draw-off point.

12. An apparatus for removing popcorn polymer which forms in a fractional distillation column in the lower section of which exists two liquid phases and an interface therebetween, the lower phase of which having a density greater than the density of said popcorn polymer, which comprises: an outlet in said lower section at said interface, two baffle members attached to the inside of said lower section of said column, one of said baffle members above and one of said baffle members below said outlet, said baffle members being spaced from each other by a distance approximately equal to the width of the liquid containing the popcorn polymer above and below said interface, a means for separating popcorn polymer from liquid, a first conduit connecting said outlet to said separating means, a second conduit connecting said separating means to said lower section at a point opposite from said outlet, and means disposed in said second conduit for withdrawing liquid containing popcorn polymer through said outlet, passing same via said first conduit through said separating means and returning the remaining liquid via said second conduit to said lower section of said column.

13. An apparatus for removing popcorn polymer which forms in a fractional distillation column in the lower section of which exists two liquid phases and an interface therebetween, the lower phase of which has a density greater than the density of said popcorn polymer, which comprises: an outlet in said lower section at said interface, two baffle members attached to the inside of said lower section of said column, one of said baffle members above and one of said baffle members below said outlet, said baffle members being spaced from each other by a distance approximately equal to the width of the liquid containing the popcorn polymer above and below said interface, a header within said lower section opposite said baffle members, said header conforming in shape to the curvature of said lower section and being provided with a plurality of outlets for converging liquid expelled therefrom towards said outlet, a means for separating popcorn polymer from liquid, a first conduit connecting said outlet to said separating means, a second conduit connecting said separating means to said header, and a pumping means disposed in said second conduit.

14. In a process wherein a liquid monomeric material is recovered from a processing zone under conditions whereby popcorn polymer particles are formed, wherein a liquid which is immiscible with and heavier than said monomeric material is added to said monomeric material in said zone in an amount sufficient to form two liquid phases whereby an interface is formed between the monomeric material phase and the immiscible liquid phase, the improvement which comprises withdrawing a liquid stream carrying said popcorn polymer particles through a draw-off point at said interface in an amount sufficient to prevent an accumulation of the polymer within the processing zone.

References Cited in the file of this patent

UNITED STATES PATENTS

| Number | Name | Date |
|---|---|---|
| 326,715 | Cattanach | Sept. 22, 1885 |
| 437,659 | Noppel | Sept. 30, 1890 |
| 497,857 | Bullock | May 23, 1893 |
| 829,308 | Willson | Aug. 21, 1906 |
| 898,861 | de Focatiis | Sept 15, 1908 |
| 1,371,414 | Edison | Mar. 15, 1921 |
| 1,524,192 | Mann | Jan. 27, 1925 |
| 1,942,446 | Peterkin | Jan. 9, 1934 |
| 2,073,446 | Ellsberg | Mar. 9, 1937 |
| 2,148,846 | VonRetze et al. | Feb. 28, 1939 |
| 2,315,423 | Hildebrandt | Mar. 30, 1943 |
| 2,318,988 | Craig | May 11, 1943 |
| 2,338,986 | Waterman | Jan. 11, 1944 |
| 2,366,360 | Semon | Jan. 2, 1945 |
| 2,366,361 | Semon et al. | Jan. 2, 1945 |
| 2,366,362 | Semon et al. | Jan. 2, 1945 |
| 2,411,809 | Rupp et al. | Nov. 26, 1946 |
| 2,445,043 | Souders et al. | July 13, 1948 |
| 2,552,412 | Drout | May 8, 1951 |
| 2,555,940 | Skimms | June 5, 1951 |
| 2,565,568 | McCants | Aug. 28, 1951 |
| 2,613,175 | Johnstone et al. | Oct. 7, 1952 |